Patented Nov. 14, 1944

2,362,516

UNITED STATES PATENT OFFICE 2,362,516

ANTIOXIDANT

Jones I. Wasson, Union, N. J., and Warren M. Smith, Baton Rouge, La., assignors to Standard Oil Development Company, a corporation of Delaware No Drawing. Application May 2, 1942,
Serial No. 441,548

9 Claims. (Cl. 252—52)

This invention relates to a novel and efficient anti-oxidant material adapted for use with various organic materials, particularly petroleum products.

An object of the invention is to provide a class of materials which, when added to any organic materials susceptible to oxidation, such as mineral lubricating oils, gasolines, fatty oils, drying oils and the like, will inhibit or substantially retard such normal oxidation and deterioration of these materials. In the case of lubricating oils, the incorporation of small proportions of the new antioxidant will substantially retard oxidation and consequent development of corrosive materials in such oils under the severe conditions of service; and added to gasolines, they greatly reduce the formation of gum and the loss in octane number. Other advantages in the use of the antioxidant materials in various organic substances will be evident from the description of the invention which follows.

It is known that phenolic susbtances present in some cracked gasolines are natural inhibitors and that their removal in treating processes tends to decrease the stability of the gasolines. Some of these phenolic substances are fairly soluble in water and alkaline solutions which extract them. It is also known that a number of synthetic phenolic inhibitors have been developed and that some of these are as effective as the natural phenolic inhibitors. It is also known that certain ethers of phenols exhibit antioxidant effects in lubricating oils and other petroleum products, but not all types of ethers have such an effect. For example, the tertiary butyl ether of o-tertiary butyl p-cresol is an effective antioxidant, whereas the corresponding methyl and isobutyl ethers are poor.

It has been discovered, in accordance with the present invention, that by converting petroleum phenols to ethers having a branched chain alkyl group as the etherifying radical, a product is formed which has antioxidant properties and which may be used effectively for inhibiting oxidation in a wide variety of organic materials.

The petroleum phenol ethers may be derived from any type of petroleum phenols, but the preferred sources of the phenols are gas oil fractions, the most desirable of these being the gas oils obtained from the cracking of petroleum fractions. Other sources are straight run petroleum fractions of the heating oil range, as well as mixtures of straight run and cracked products. The phenolic compounds may be extracted readily by means of strong aqueous or alcoholic alkali solutions. The phenols are liberated from the extract solution by treatment with carbon dioxide or a weak mineral acid. The liberated phenolic compounds may be purified by distillation under reduced pressure or by blowing with air or by any other suitable means.

Although it is difficult to isolate pure components from the petroleum phenols, information on the general nature of these phenols has been obtained by analytical data from hydrogen and carbon analyses, acetylation and saponification determinations, molecular weight determinations by the freezing point method, boiling point determinations, etc. As a rule, these phenolic compounds contain very little, if any, cresols, and they are predominately high molecular weight compounds. Furthermore, as compared to alkyl phenols, the petroleum phenols exhibit a deficiency of hydrogen which becomes progressively greater as the molecular weights are increased. With this deficiency of hydrogen, there is also an indication that the higher molecular weight petroleum phenols contain some additional non-phenolic oxygen. To some extent, the petroleum phenols are indicated to contain cyclic substituents.

Despite the complex nature of the petroleum phenols, it has been found easy to convert them to ethers by substituting for hydrogen of the phenolic hydroxyl groups a branched chain alkyl radical. This conversion may be carried out in accordance with well known methods of alkylating through the oxygen linkage, as, for example, by using sulfuric acid as the catalyst and isobutylene or other tertiary olefins as the reactant under suitable conditions, or by heating the phenols with an alcohol, such as tertiary butyl alcohol, in the presence of sulfuric acid or a metal halide as a catalyst. Also, an alkali metal phenate may be reacted with an alkyl halide to form the ether. By properly controlling the alkylating conditions and the concentrations of the reactants, an alkyl radical is substituted for the hydrogen of the phenolic hydroxyl group. Often there is also a substitution of an alkyl radical for a hydrogen in the ring of the phenolic compound. This is a desirable result, as the additional alkyl group confers greater solubility in oils. If desired, a preliminary alkylation of the phenol nucleus may be conducted, using, for example, an olefin other than that to be employed later in forming the ether group, but such procedure is in general not warranted.

The resulting ether derivatives of the petroleum phenols are normally liquid, are readily soluble in mineral lubricating oils, gasolines and the like, are less soluble in water or aqueous alkaline solutions than the petroleum phenols, and are considerably more effective than the original phenols for inhibiting the oxidation of organic materials.

In its broadest terms the present invention comprises the use in organic materials of a small proportion of a branched chain aliphatic ether of a petroleum phenol, preferably a tertiary alkyl ether of a petroleum phenol or of an alkylated petroleum phenol. By the term "ether of a petroleum phenol" it is intended to include any product obtained by etherifying a petroleum phenol, whether or not by the etherifying process one or more alkyl groups are also introduced into the aromatic nucleus. Included within the scope of the present invention are ethers of the type described in which one or more of the hydrogen atoms of the aromatic nucleus or of any alkyl group attached thereto or of the ether group may be replaced by substituent atoms, such as oxygen, sulfur, nitrogen, phosphorus or halogen, or groups such as alkyl, aralkyl, cycloalkyl, —OH, —SH, —NH$_2$, —NH(alkyl), —N(aryl)$_2$, —O(alkyl), —O(aryl), —S(alkyl), —S(aryl), —CO(alkyl), —CO(aryl), —CHO, —COOH, —COO(alkyl), as well as groups containing metals, such as —OM, —SM, —COOM, —CSSM, etc., or, in place of the metals basic groups, such as the ammonium, sulfonium, phosphonium, and pyridonium base radicals, M representing a metal or a metal equivalent. As stated above, the petroleum phenol ethers may be prepared by reacting the petroleum phenol with an olefin or hydrocarbon mixture containing an olefin or with an alcohol in the presence of a suitable catalyst, but the reaction with an olefin is preferable, since with an alcohol a lower temperature and considerably more sulfuric acid catalyst is required. A suitable method for the preparation of the tertiary butyl ether of a petroleum phenol is described in Example 1.

EXAMPLE 1

One hundred and twenty grams of tertiary butyl alcohol were placed in a suitable reaction vessel with 40 grams of petroleum phenols (B. P.=92–107° C., at 4 mm.), obtained by extracting a heating oil fraction of cracked petroleum oil with strong caustic alkali solution, liberating the free phenols by treatment with carbon dioxide and fractionating the resulting phenols to obtain the desired cut. 41 cc. of concentrated sulfuric acid were placed in a dropping funnel and allowed to flow by drops into the reaction mixture with stirring during a period of 30 minutes, while the temperature was allowed to rise to a maximum of 50° C. The mixture became turbid and stirring was continued for another 45 minutes at this temperature. After cooling the product was poured into ice water, extracted with ether, the extract being washed and then dried over sodium sulfate. The ether was removed under 30 mm. pressure at 100° C. The product was distilled to remove polymer at 65–80° C., and the undistilled residue was washed with a solution of 10 grams sodium hydroxide in 70 cc. absolute alcohol and 100 cc. water and then with a solution of 10 grams sodium hydroxide in 70 cc. absolute alcohol and 30 cc. water. Finally it was washed with water, acidified with hydrochloric acid, washed free of acid and dried over sodium sulfate. The weight of the residue (FI) was 35 grams. This was distilled at 3 mm. pressure to produce two fractions: FI$_1$ (B. P.=85–125° C.), wt.=12 grams, and FI$_2$ (B. P.=125–135° C.), wt.=15 grams. The fraction FI$_2$ consisted of petroleum phenol ethers.

The unetherified alkylated petroleum phenols produced in the above reaction and separated by the caustic washing were recovered in purified form by combining the caustic extracts, acidifying, extracting with ether, washing, drying and distilling at 3 mm. The distillate (FII) (B. P.=109–125° C., 3 mm.) weighed 21 grams and consisted of a reddish oil.

As previously stated, the new antioxidants may advantageously be used to retard the oxidation of organic materials susceptible to normal deterioration or alteration in the presence of oxygen. They are of particular value in inhibiting the oxidation of mineral lubricating oils, such as turbine oils and engine crankcase oils, under conditions of service in which there are normally formed considerable quantities of oxidation products which cause deterioration of the oil and which are corrosive to metal surfaces. The new antioxidants will greatly retard the formation of such corrosive substances. For this purpose it is generally preferred to add 0.01 to 5%, usually 0.1 to 1.0%, of the materials to an oil. The exact amount to be used for optimum results will depend partly upon the particular type of composition being used as well as upon other factors, such as severity of the operating conditions to which the lubricating oil will be exposed and the nature of the mineral oil base stock itself. The new additives are also effective in reducing varnish and sludge formation in engines and in increasing the resistance of lubricating oils to the formation of products which increase their tendency to emulsify or to go off color or to acquire other undesirable characteristics. The additives can be used in distillates and in oils containing residual stocks. The oils may be extracted, filtered, hydrogenated, acid treated or otherwise refined, and of high or low viscosity index, and they may be natural or synthetic oils. The finished lubricating oil compositions may also contain other addition agents, such as are found in lubricating compositions, for example oiliness agents, thickeners, viscosity index improvers, pour depressants, detergents, sludge dispersers, solvents, other antioxidants, dyes, etc.

The additives are also very useful in stabilizing greases and also may modify the flow characteristics of such products.

The new antioxidants may likewise be employed in gasolines and in motor fuels to reduce the loss in octane number and to decrease the amount of gum formed on aging in storage or on exposure to sunlight. The quantities of antioxidant preferred for this use are in general from 0.001 to 0.5%.

The antioxidants are of value when added to "white products" obtained from petroleum, such as kerosene, white oils and waxes. The amounts to be added are in general of a range similar to that preferred for gasoline.

Many further uses of the new class of antioxidant materials can be mentioned: for example, they may be used in drying oils and in paints and other coating compositions containing such oils to retard skinning and deterioration of the ultimate paint films; and they may be added to fatty oils of animal or vegetable origin to prevent the development of acids and rancidity; generally they may be used in any organic materials subject to deterioration by atmospheric oxygen.

The effectiveness of the petroleum phenol ethers in retarding the oxidation of a turbine oil is illustrated in the following example.

EXAMPLE 2

A light turbine oil of about 150 seconds viscosity Saybolt at 100° F. was submitted to the Staeger oxidation test, with and without the tertiary butyl ether of petroleum phenols, prepared according to the method of Example 1 (fraction FI₂). The test was conducted as follows:

200 cc. of the oil were poured into a glass beaker of 400 cc. capacity. To accelerate aging, a cleaned and polished copper strip 40 x 70 mm. and 1 mm. thick was put into the beaker as a catalyst. The beaker containing the oil and catalyst was placed on a rotating shelf in an oven, the oven temperature being maintained at 110° C. and the shelf rotated at 5 to 6 R. P. M. Purified air was blown through the oven at the rate of 1.5 to 2 cu. ft. per hour. The life of the oil was determined by observing the time required for the oil to show deterioration as evidenced by a neutralization number of 0.2.

The results of the test are shown in Table I.

Table I

| Oil | Hours life |
| --- | --- |
| Base oil | 72 |
| Base oil+0.25% petroleum phenol ethers | 162 |

The effectiveness of the new antioxidants in preventing bearing corrosion in the presence of lubricating oils, as compared with non-etherified petroleum phenols and alkylated petroleum phenols, is shown in the data of Example 3.

EXAMPLE 3

Samples of oil blends containing, separately, 0.25% of (1) the purified petroleum phenols used as starting material in Example 1, (2) tertiary butyl petroleum phenols, obtained by the process of Example 1 (FII), and (3) tertiary butyl ether of petroleum phenols, obtained by the process of Example 1 (FI₂), as well as a sample of the unblended base oil, which was a refined mineral lubricating oil of S. A. E. 20 grade, were submitted to a bearing corrosion test in which the extent of weight loss due to corrosion by the oil was determined. This test was conducted as follows:

500 cc. of the oil were placed in a glass oxidation tube (13" long and 2⅝" diameter), fitted at the bottom with a ¼" bore air inlet tube perforated to facilitate air distribution. The oxidation tube was then immersed in a heating bath so that the oil temperature was maintained at 325° F. during the test. Two quarter sections of automotive bearings of copper-lead alloy of known weight, having a total area of 25 sq. cm., were attached to opposite sides of a stainless steel rod which was then immersed in the test oil and rotated at 600 R. P. M., thus providing sufficient agitation of the sample during the test. Air was then blown through the oil at the rate of 2 cu. ft. per hour. At the end of each four hour period the bearings were cleaned and weighed and their surfaces repolished. The cumulative weight loss of the bearings used in a given test at the end of two four hour periods are given in Table II.

Table II

| Oil | Bearing weight loss, mg. | |
| --- | --- | --- |
| | 4 hrs. | 8 hrs. |
| Base oil | 3 | 127 |
| Base oil+0.25% purified petroleum phenols | 0 | 305 |
| Base oil+0.25% tert. butyl petroleum phenols | 8 | 222 |
| Base oil+0.25% tert. butyl ether of petroleum phenols | 2 | 9 |

It can be seen that the non-etherified petroleum phenols, whether alkylated or not, actually promoted corrosiveness during the longer period, while the ether was very effective in preventing corrosion.

A further test of the effectiveness of the petroleum phenol ethers in lubricating oils was made by applying the standard Indiana oxidation test. The tests are described in Example 4.

EXAMPLE 4

A sample of the unblended lubricating oil base stock used in Example 3 and a further sample of the same containing 0.25% of the tertiary butyl ether of petroleum phenols, prepared as in Example 1 (FI₂), were submitted to the Indiana oxidation test for 24, 48, 72, and 96 hour periods. The results are shown in Table III.

Table III

| Oil | Mg. sludge/10 grams | | | |
| --- | --- | --- | --- | --- |
| | 24 hrs. | 48 hrs. | 72 hrs. | 96 hrs. |
| Base oil | 0 | 0 | 7 | 46 |
| Base oil+0.25% tert. butyl ether of petroleum phenols | 0 | 0 | 5 | 31 |

This invention is not to be considered as limited by any of the examples mentioned or described herein, which are given for illustrative purposes only, but is to be limited solely by the terms of the appended claims.

We claim:

1. An organic composition containing a small amount of a branched chain aliphatic ether of a petroleum phenol.

2. An improved lubricant which comprises an oil base and a small quantity of a branched chain alkyl ether of a petroleum phenol.

3. A lubricant for internal combustion engines which comprises a mineral oil base and a small quantity of a tertiary alkyl ether of a petroleum phenol.

4. A lubricant for internal combustion engines which comprises a mineral oil base and a small quantity of a tertiary butyl ether of a petroleum phenol.

5. A lubricant for internal combustion engines which comprises a mineral oil base and 0.1 to 1.0% of a tertiary butyl ether of a petroleum phenol.

6. An organic composition containing a small amount of a product obtained by treating a gas oil fraction of a cracked petroleum product with a strong caustic solution, liberating the free phenols from the extracted solution by treating with an acid, separating and purifying said free phenols, and alkylating the said phenols with a branched chain aliphatic alkylating agent to form a branched alkyl phenol ether.

7. A lubricant for internal combustion engines which comprises a mineral oil base and a small quantity of a product obtained by treating a gas oil fraction of a cracked petroleum product with a strong caustic solution, liberating the free phenols from the extracted solution by treating with an acid, separating and purifying said free phenols, and alkylating the said phenols with a branched chain aliphatic alkylating agent to form a branched alkyl phenol ether.

8. A turbine oil which comprises a mineral oil base and a small quantity of a branched chain ether of a petroleum phenol.

9. A turbine oil which comprises a mineral oil base and a small quantity of a tertiary butyl ether of a petroleum phenol.

JONES I. WASSON.
WARREN M. SMITH.